United States Patent [19]
DeCool et al.

[11] Patent Number: 5,140,846
[45] Date of Patent: Aug. 25, 1992

[54] PNEUMATIC MEASUREMENT APPARATUS

[75] Inventors: Francois DeCool; Jacques Legrand, both of Bayeux, France

[73] Assignee: Ateliers de Normandie, Paris, France

[21] Appl. No.: 641,729

[22] Filed: Jan. 15, 1991

[30] Foreign Application Priority Data

Jan. 22, 1990 [FR] France ............... 90 00687

[51] Int. Cl.⁵ .................................. G01B 13/08
[52] U.S. Cl. ..................................... 73/37.5
[58] Field of Search ..................... 73/37.5, 37.8

[56] References Cited

U.S. PATENT DOCUMENTS

| | | | |
|---|---|---|---|
| 2,692,498 | 10/1954 | Knobel | 73/37.5 |
| 4,059,130 | 11/1977 | Cohen | 73/37.5 |
| 4,420,972 | 12/1983 | Hitachi | |
| 4,550,592 | 11/1985 | Dechape | |
| 4,607,960 | 8/1986 | Wulff | 73/37.5 |
| 4,854,156 | 8/1989 | Hoeffel et al. | 73/37.5 |

FOREIGN PATENT DOCUMENTS 2016538 10/1971 Fed. Rep. of Germany ....... 73/37.5

OTHER PUBLICATIONS

Patent Abstracts of Japan, vol. 7, No. 245 (P-233) [1390], Oct. 29, 1983, & JP-A-58 132 618 (Hitachi Seisakusho) Aug. 8, 1983 *Abrégé*.

Primary Examiner—Michael Razavi
Assistant Examiner—Raymond Y. Mah
Attorney, Agent, or Firm—Griffin Branigan & Butler

[57] ABSTRACT

The apparatus of the invention comprises a measurement chamber fed with gas under pressure by a feed nozzle, a measurement chamber having an outlet nozzle spaced apart from the feed nozzle and including a pressure take-off point disposed between the feed nozzle and the outlet nozzle. According to the invention, a separating partition extends inside the measurement chamber overlying the pressure take-off point and co-operates with the wall of the measurement chamber to determine a volume which is closed in airtight manner at its outlet nozzle end and which is open at its inlet nozzle end in the vicinity of the inlet nozzle.

3 Claims, 1 Drawing Sheet

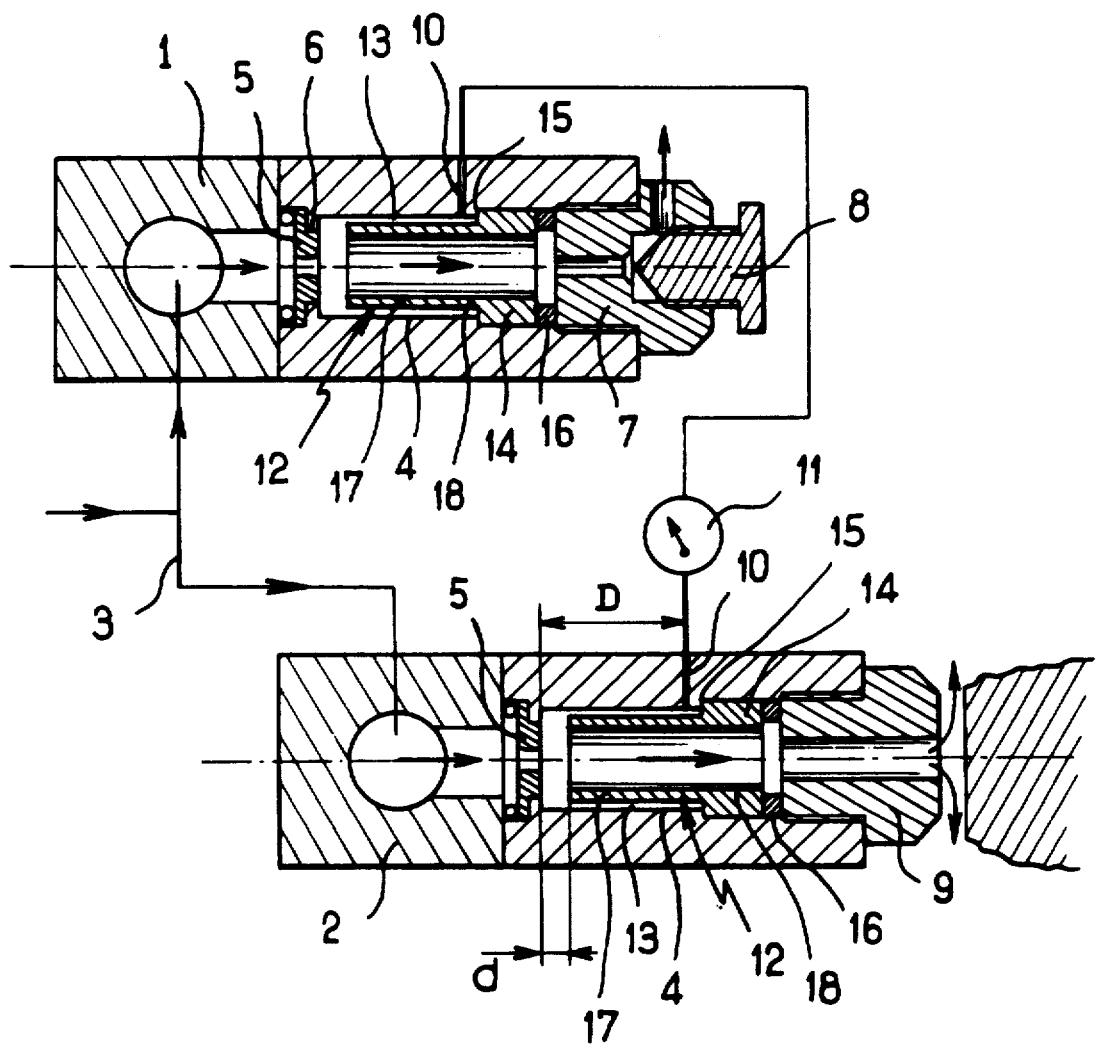

PNEUMATIC MEASUREMENT APPARATUS

The present invention relates to pneumatic measurement apparatus.

BACKGROUND OF THE INVENTION

Pneumatic measurement apparatuses are known that use a pressure measurement for determining the distance between a measurement nozzle of the apparatus and a facing wall, said distance itself being representative of the dimension of a part to be monitored. In the most common case, the pneumatic measurement apparatus includes two measurement branches connected to a common feed, with each branch including a measurement chamber fed with gas under pressure via a feed nozzle, an outlet nozzle spaced apart from the feed nozzle, and a pressure take-off point disposed between the feed nozzle and the outlet nozzle. The pressure take-off points in the two outlet branches are connected to a differential pressure gauge, with one of the measurement branches having an outlet nozzle of fixed or adjustable leakage section to serve as a reference branch while the other measurement branch includes a measurement outlet nozzle generating a leakage section that varies as a function of the distance of the object to be measured relative to the measurement outlet nozzle. When the feed pressure is particularly stable, it is possible to make do with only one measurement branch fitted with a measurement outlet nozzle. In either case, it has been observed that in order to perform a pressure measurement without excessive noise, i.e. without the measurement being excessively influenced by disturbances that result from the flow of gas in the measurement chamber and that have no relationship with the distance between the measurement outlet nozzle and the object to be measured, it is necessary to provide a distance between the feed nozzle and the pressure take-off point which is of the order of 30 times to 100 times the diameter of the feed nozzle, i.e. a distance of 42 mm to 140 mm for a commonly-used feed nozzle having a diameter of 1.4 mm. Such a constraint is extremely penalizing from the point of view of the space occupied by the measurement apparatus.

An object of the invention is to provide measurement apparatus that is more compact.

SUMMARY OF THE INVENTION

The present invention provides a pneumatic measurement apparatus comprising at least one measurement chamber fed with gas under pressure by a feed nozzle, said measurement chamber having a measurement outlet nozzle spaced apart from the feed nozzle and including a pressure take-off point disposed between the feed outlet nozzle and the outlet outlet nozzle and passing through a wall of the measurement chamber, which wall extends substantially parallel to the flow direction of the gas inside the measurement chamber, wherein the apparatus includes a separating partition extending inside the measurement chamber overlying the pressure take-off point and co-operating with the wall of the measurement chamber to determine a volume, i.e. define a space, which is closed in airtight manner at its outlet outlet nozzle end and which is open at its feed nozzle end in the vicinity of the feed nozzle.

It has been observed that in this way the pressure take-off point is isolated from the disturbances caused by gas flowing through the measurement chamber and that it is therefore possible to move the pressure take-off point significantly closer to the feed nozzle, thereby obtaining a corresponding reduction in the overall dimensions of the measurement chamber.

In an advantageous variant of the invention, in which the measurement chamber is cylindrical, the separating partition is tubular and delimits an annular volume. The separating partition is preferably mounted removably inside the measurement chamber. The separating partition is thus made very cheaply and its removable nature makes it very easy to adapt the measurement apparatus to the characteristics of the feed nozzle and of the outlet nozzle.

BRIEF DESCRIPTION OF THE DRAWING

An embodiment of the invention is described by way of example with reference to the sole FIGURE of the accompanying drawing which is a fragmentary diagrammatic view of measurement apparatus comprising two measurement chambers of the invention shown in axial section.

DETAILED DESCRIPTION

With reference to the figure, the pneumatic measurement apparatus of the invention comprises two measurement branches 1 and 2 connected to a common feed duct 3 delivering gas under pressure. Each measurement branch comprises a measurement chamber 4 connected to the feed duct 3 via a feed nozzle 5 which is held centered relative to the measurement chamber 4 by a circular rim 6 against which it bears. The measurement chamber 4 preferably has a cylindrical wall coaxial with the feed nozzle 5 and at its end furthest from the feed nozzle 5 it includes an outlet nozzle 7,9. In measurement branch 1, outlet nozzle 7 is a reference nozzle including a needle screw 8 for adjusting the leakage flow rate from the outlet nozzle, whereas in the measurement branch 2 which is used to perform the measurement per se, the measurement chamber 4 is fitted with a measurement outlet nozzle 9.

A pressure take-off point 10 is formed by a hole through the side wall of the measurement chamber 4, which hole extends perpendicularly to the flow direction of the gas through said measurement chamber. The hole 10 extends substantially perpendicularly to the wall and opens out in the measurement chamber 4 at a distance D from the face of the feed nozzle that faces the measurement chamber 4. This distance D normally needs to lie in the range 30 times to 100 times the diameter of the feed nozzle. The pressure take-off points 10 in the reference branch 1 and in the measurement branch 2 are connected to a differential pressure gauge 11.

A tubular sleeve 12 is disposed in each measurement chamber 4 in order to provide a separating partition overlying the pressure take-off point 10 and co-operating with the wall of the measurement chamber to define a volume 13 which is closed in airtight manner at the measurement outlet nozzle end and which is open at the feed nozzle end in the vicinity of the feed nozzle.

In the preferred embodiment as shown, the sleeve 12 is removable. It comprises a cylindrical first portion 14 which bears against a shoulder 15 of the measurement chamber 4 and which is held pressed thereagainst in airtight manner by a sealing ring 16 which is compressed by the measurement outlet nozzle 9 being screwed into the body of the chamber. Beyond the shoulder 15 going towards the feed nozzle, the sleeve 12 has a cylindrical portion 17 whose outside diameter is slightly smaller than the inside diameter of the measurement chamber 4. The portion 17 extends to a distance d from the wall of the feed nozzle 5 facing the measurement chamber 4. The sleeve has a cylindrical central bore 18 running along its entire length.

By way of particular and non-limiting example, the apparatus of the invention has been made with a measurement chamber having an inside diameter of 8 mm in the portion adjacent to the feed nozzle, a feed nozzle having a diameter of 1.22 mm, a sleeve 12 having an outside diameter of 7.2 mm and an inside diameter of 6 mm in its portion overlying the pressure take-off point 10, said sleeve extending to within a distance d of the face of the feed nozzle where d is equal to 3 mm. For a feed pressure of 300 kPa and for a pressure in the measurement chamber of about 200 kPa, the apparatus of the invention delivers noise of only 0.2 kPa whereas similar apparatus not including the sleeve 12 gives rise to measured noise of 0.7 kPa. It is thus observed that for a distance D equal to no more than about 20 times the diameter of the feed nozzle, excellent measurement results are obtained. In practice, it has been observed that the distance D can be further reduced to about 10 times the diameter of the feed nozzle, with the distance d being about 2 times to 5 times the diameter of the feed nozzle, and preferably about 3 times the diameter of the feed nozzle.

Naturally, the invention is not limited to the embodiment described and variants may be applied thereto without going beyond the scope of the invention. In particular, it is possible to have a fixed separating partition inside the measurement chamber. It is also possible to provide a separating partition of any shape which is adapted to the shape of the measurement chamber providing it is disposed relative to the pressure take-off point in such a manner as to reduce the turbulence that results from gas flowing through the measurement chamber.

We claim:

1. Pneumatic measurement apparatus comprising at least one measurement chamber fed with gas under pressure by a feed nozzle, said measurement chamber having a measurement outlet nozzle spaced apart from the feed nozzle and including a pressure take-off point disposed between the feed nozzle and the measurement outlet nozzle and passing through a wall of the measurement chamber, which wall extends substantially parallel to the flow direction of the gas inside the measurement chamber, wherein the apparatus includes a separating partition extending inside the measurement chamber, overlying the pressure take-off point, and determining with a facing portion of the wall of the measurement chamber a space which is closed in airtight manner at its measurement outlet nozzle end and which is open at its feed nozzle end in the vicinity of the feed nozzle.

2. Pneumatic measurement apparatus according to claim 1, wherein the measurement chamber is cylindrical and in that the separating partition is tubular and delimits an annular volume.

3. In a pneumatic distance measurement apparatus having at least one branch comprising an elongated measurement chamber having a feed nozzle connected to a source of pressurized gas and an measurement outlet nozzle spaced from the feed nozzle so that gas flows within the measurement chamber according to a longitudinal direction of the measurement chamber, and a pressure take off point passageway disposed through a wall extending substantially parallel to the longitudinal direction of the measurement chamber and disposed between the feed nozzle and the measurement outlet nozzle, the improvement comprising:

an elongated separating partition axially disposed within the measurement chamber and extending from near the measurement outlet nozzle to a position between the pressure take-off passageway and the feed nozzle such that a space is defined between the walls of the measurement chamber and the partition, which space is closed in a gas-tight manner at an end thereof next to the measurement outlet nozzle and is opened at an end thereof next to the feed nozzle.

* * * * *